United States Patent [19]

Shank, Jr.

[11] 3,863,753

[45] Feb. 4, 1975

[54] CHUCK APPARATUS FOR SUPPORTING CONTAINERS BY THE FINISH PORTION THEREOF

[75] Inventor: Herbert C. Shank, Jr., Lancaster, Ohio

[73] Assignee: Anchor Hocking Corporation, Lancaster, Ohio

[22] Filed: May 10, 1973

[21] Appl. No.: 358,864

[52] U.S. Cl.................... 198/179, 198/210, 279/37, 294/90, 294/115, 294/116
[51] Int. Cl............................................ B65g 19/00
[58] Field of Search .............. 279/37; 198/210, 179; 294/116, 110, 86, 115, 90

[56] References Cited
UNITED STATES PATENTS
| 938,534 | 11/1909 | Whitney | 279/37 |
| 2,911,251 | 11/1959 | Osborn | 294/116 |

FOREIGN PATENTS OR APPLICATIONS
250,192   12/1926   Great Britain........................ 198/22

Primary Examiner—Evon C. Blunk
Assistant Examiner—Jeffrey V. Nase
Attorney, Agent, or Firm—Wood, Herron & Evans

[57] ABSTRACT

Apparatus for supporting a container in a vertical position by the finish portion thereof, including a plurality of chuck jaws pivotally movable between an outwardly spread open position and a radially inward closed position wherein the jaws substantially completely enclose the container finish and support the container by it. The jaws are movable to the closed position by means of a vertically movable annular sleeve adapted to engage and surround the jaws. The jaws are hung on pivots and swing outward to the open position by the force of gravity when the sleeve is moved out of engagement from them.

6 Claims, 6 Drawing Figures

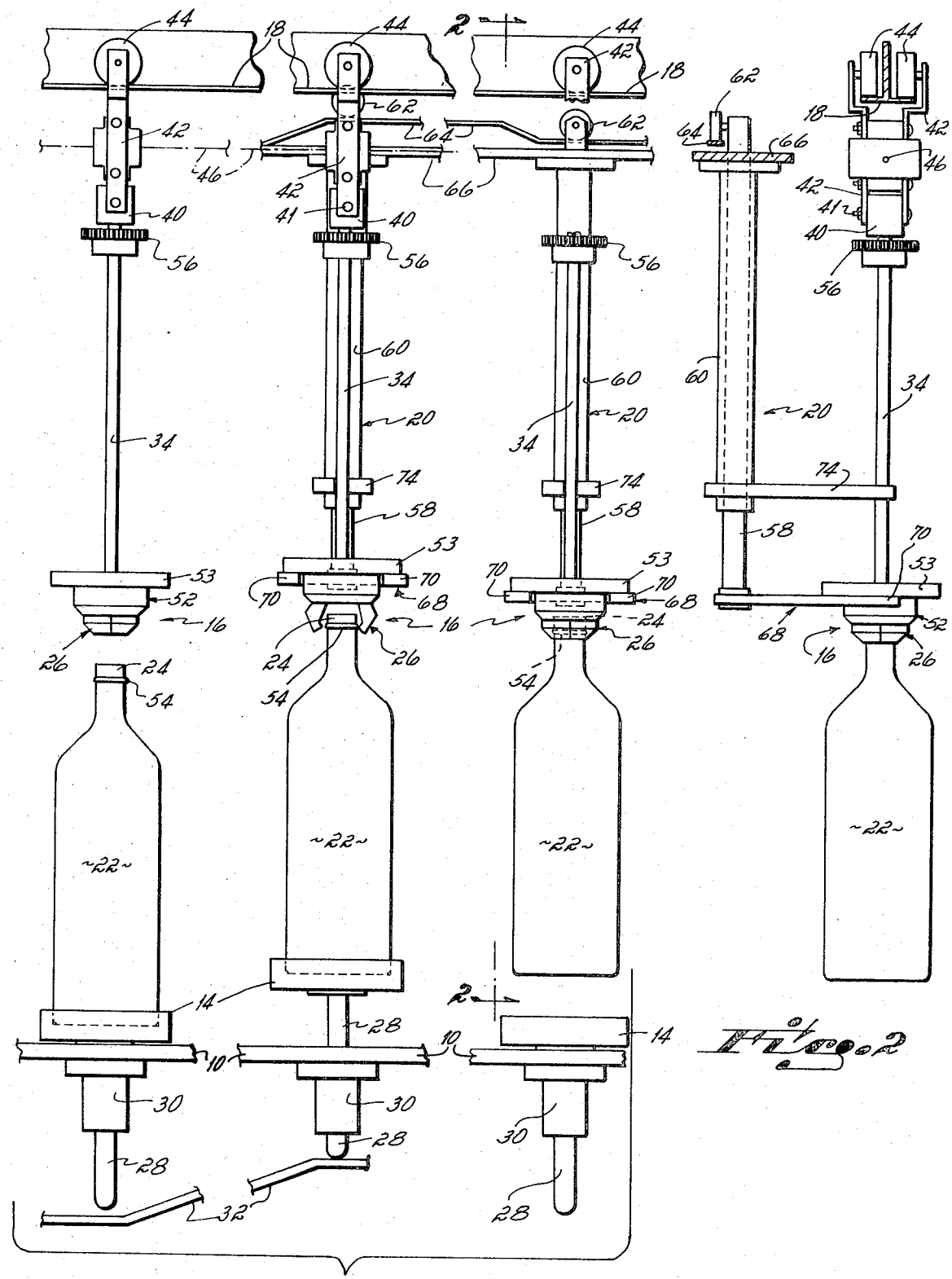

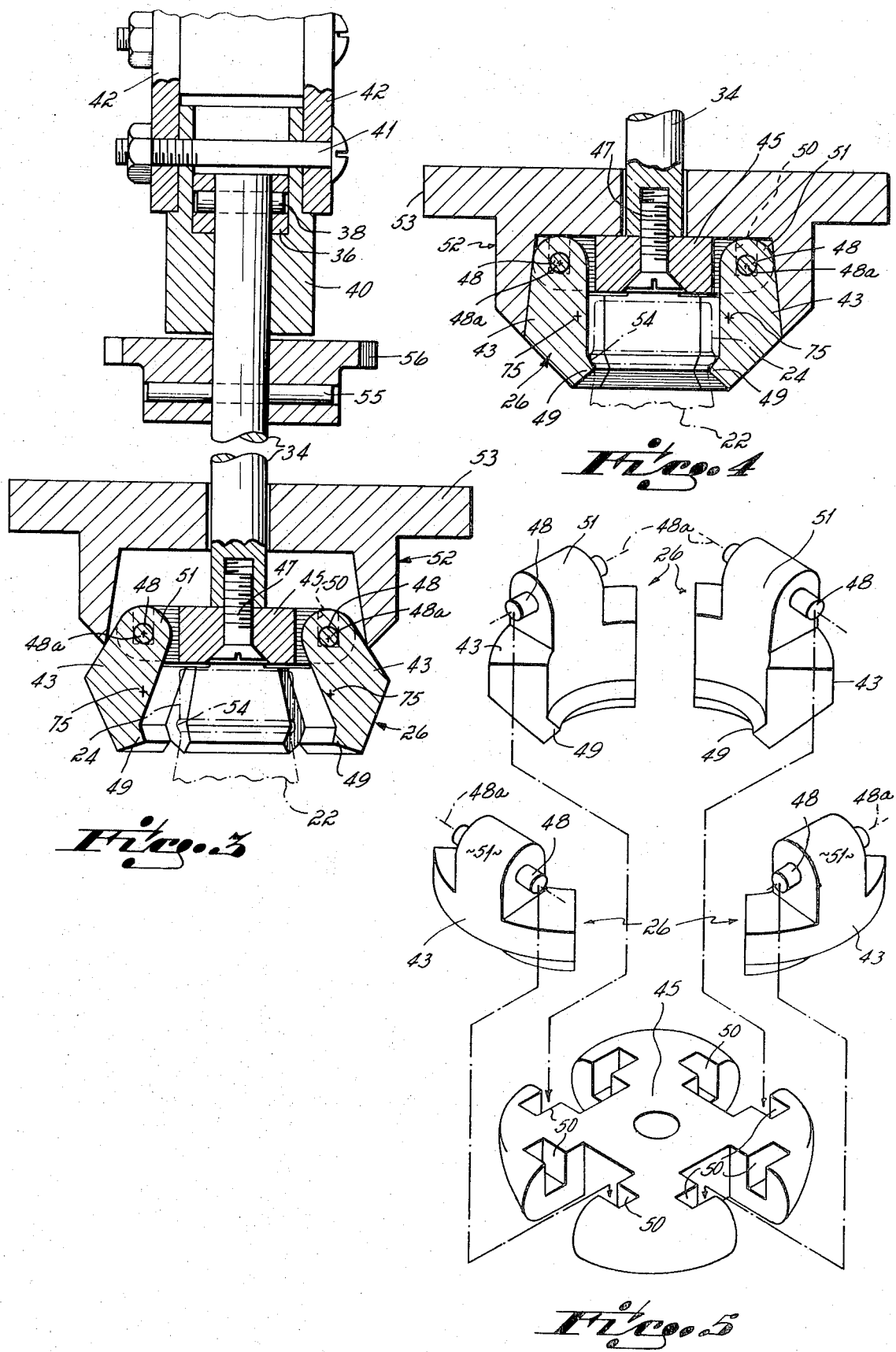

CHUCK APPARATUS FOR SUPPORTING CONTAINERS BY THE FINISH PORTION THEREOF

This invention relates to an improved chuck assembly for use in an automatic container manufacturing operation and, more particularly, to an improved chuck assembly for supporting containers in a vertical position by the finish or closure receiving portion thereof.

At various stages in the manufacture, inspection and processing of glass containers it may be necessary or desirable to carry each container by its finish. This is appropriate, by way of example, where a coating is to be applied to the body and base of the container. The presence of a belt or other carrier beneath the container would interfere with application of the coating, and of course, would block coating of the base.

It has become common practice to apply one or more coatings to glass articles moving in a continuous line, for example, to increase the abrasion and scratch resistance of the exterior surface of the articles. In such automated operations, the glass containers typically move on a continuous conveyor and are passed into a treatment area wherein they are sprayed with or otherwise exposed to a suitable coating material. In order for the containers to be commercially acceptable, the thickness of the coating must be uniform and controlled; and, furthermore, the coating must be prevented from contacting the finish portion of the container to prevent possible contamination of the interior thereof and/or to prevent possible corrosion of a metal cap ultimately to be placed on the finish portion.

It is known in the art to provide chucks to grip containers at the finish and to rotate them while they are moving linearly during a coating operation. For example, U.S. Pat. No. 3,060,057 discloses one such chuck design. However, there has been a need for a very simple, smooth-acting chuck comprised of a minimum of moving parts and which not only functions to support and suspend a container for coating but which also functions effectively to mask the finish during the coating operation.

Accordingly, it is among the principal objects of this invention to provide an improved chuck assembly which is operative to support containers by the finish in a vertical position and to function as an effective finish mask during a subsequent coating operation.

In accordance with the preferred embodiment of the invention, this object and others are accomplished by providing a chuck assembly comprising a chuck body, a plurality of vertically disposed chuck jaws mounted by the body and extending therebelow pivotally movable between a spread apart open position and a radially inward closed position wherein the jaws cooperate to form a substantially closed annulus or mask about the finish portion, and a vertically movable annular sleeve operative to engage and cam the jaws from the open position to the closed position. The jaws include a lip portion adapted to engage the container finish in the closed position and to support the container thereby. The jaws are so designed that when they are in closed position, their respective centers of gravity or mass lie radially interiorly of the pivotal axes of the jaws, whereby the jaws are biased by gravity to the open position. When the sleeve is moved upwardly or out of engagement with the jaws they thus freely swing to the open position wherein the center of gravity of the jaws lies beneath their respective pivotal axes. In combination with the chuck assembly is a lift means operative to move the annular sleeve into and out of engagement with the chuck jaws for loading and unloading of the jaws.

It is recognized that chucks having swingable jaws are known. In U.S. Pat. No. 54,990, there is disclosed a brace with a chuck having a circular ring that holds jaws inwardly on a body member, to retain a drill or bit. However, it has not been known, insofar as I am aware, to provide a chuck having jaws which are hinged or pivoted to a body in such position as automatically to swing under gravity to open "ready to load" position unless restrained from doing so by a surrounding sleeve, and which jaws also provide a mask to cover the end portion of the article that they grip.

Other objects and advantages of the invention will be apparent from the following detailed description, reference being had to the accompanying drawings, in which:

FIG. 1 is a fragmentary side elevational view of a preferred form of the chuck assembly in combination with a continuously moving conveyor and means for locking and unlocking the chuck jaws;

FIG. 2 is a vertical section taken along line 2—2 of FIG. 1;

FIG. 3 is an enlarged fragmentary cross-sectional view of the chuck assembly in the open position;

FIG. 4 is a cross-sectional view of a portion of the chuck assembly in the closed position;

FIG. 5 is an exploded view of the chuck jaws and chuck body; and

Figure 6:
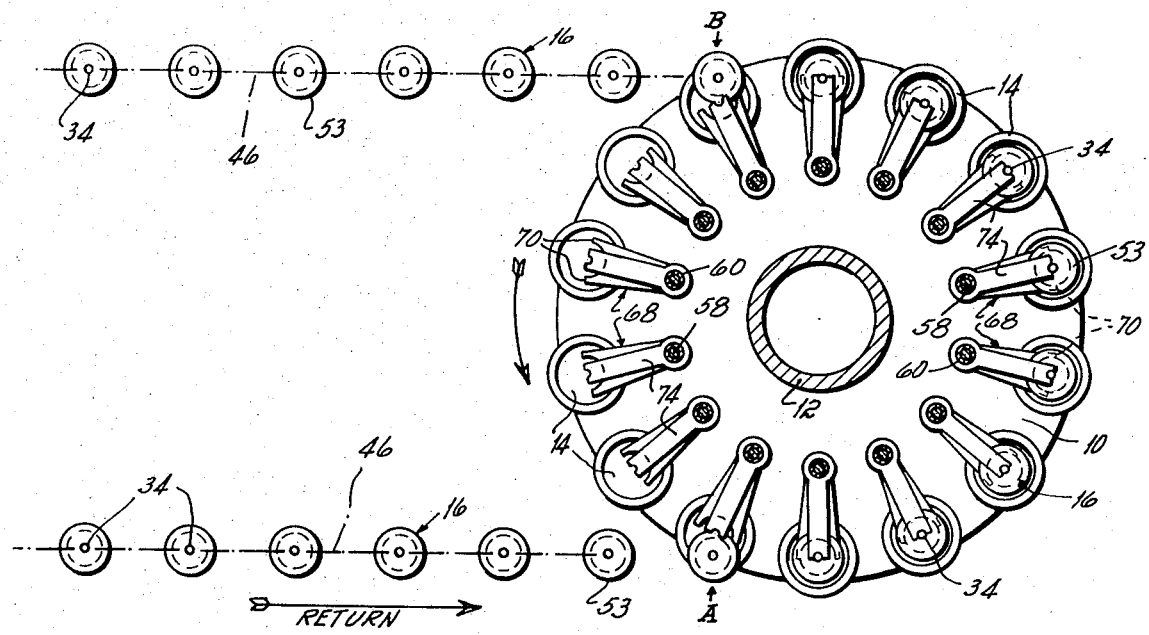
FIG. 6 is a top plan view of an automatic chuck loading system in combination with the chuck of this invention.

The chuck assembly in accordance with this invention is described hereinafter with particular reference to an automatic container coating system wherein the glass containers are sequentially loaded into a continuously moving line of chuck assemblies, carried through a coating operation, and then unloaded from the chucks, after which the empty chucks return to the loading station in a continuous operation.

Referring now to the drawings, and particularly to FIG. 1 and FIG. 6, by way of illustration such an automatic handling system comprises a continuously rotating table 10 mounted on a centrally disposed drive shaft 12 and including a plurality of individual container seats or trays 14 equally spaced about its circumference, a continuously moving line of chuck assemblies 16 suspended from and driven on an overhead track 18 in synchronization with the rotation of the table 10, and a plurality of chuck unlocking or lift mechanisms 20 mounted on the drive shaft 12 and radially aligned with the container trays 14. The system is designed such that the chuck assemblies 16 move tangentially or sideways into and out of the circumference of the rotating table 10 and travel an arcuate portion thereof in vertical axial alignment with the container trays 14. The table thus acts as a means for moving the lift mechanism into position for operating or unloading the chucks, as described hereinafter. The trays are shaped to provide a seat for the container base (see FIG. 1).

In operation, as will hereinafter be more fully explained in detail, the chuck assemblies 16 move continuously and sequentially into axial alignment above the container trays, as shown at point A of FIG. 6. With a container 22 seated therein, the tray 14 is moved upwardly. Simultaneously, by means of an associated lift mechanism shown generally at 20, the chuck assembly 16 is opened to receive the container finish portion 24. While the table 10 rotates with the chuck assembly 16 moving in synchronization therewith, the chuck jaws 26 are closed and they grasp the container finish 24. The container tray 14 then returns to its lowered position, and the suspended containers 22 are carried tangentially from the loading table 10, as shown at point B of FIG. 6, toward the coating or other processing operation. After such processing, the containers are unloaded from the chuck jaws 26 in the reverse manner from which they were loaded, and the empty chuck assemblies 16 return to the loading table 10 in a continuous container handling operation.

The following detailed description will make the nature of the apparatus and the container handling operation more clear. Referring in addition to FIGS. 2, 3 and 4, the individual container trays 14 are mounted on vertically reciprocal rods or shafts 28, each of which extends through the loading table 10 and moves in a bushing 30 attached to the bottom surface thereof. As the table 10 rotates, the rods 28 sequentially contact and slide on a cam track 32 beneath the table 10 which raises the trays 14 and, consequently, the glass containers 22 seated therein to a position underneath the vertically aligned chuck assemblies 16. This carries the containers 22 into the chuck jaws 26, which are open to receive them. After loading, the rods 28 ride off the cam track 32 and the trays 14 fall to the lowered position, so that the containers are thereafter carried by the chucks.

The chuck assembly 16 comprises a spindle 34 carried by means which mount it vertically. Specifically, spindle 34 is mounted at its upper end in a bearing 36 by means of a pin 38 which in turn is mounted in a housing 40. Extending upwardly from the housing 40 and attached thereto by bolts 41 are a pair of brackets 42 which carry wheels 44 that ride on the overhead track 18. The chuck assembly 16 is driven by suitable means such as a cable 46 and moves in synchronization with the rotation of the table 10. At the lower end of the spindle 34 is attached a horizontally disposed chuck body 45. The chuck body is mounted to spindle 34 as by a screw 47, and is adapted to receive and support the individual chuck jaws 26.

As shown in FIG. 5, the chuck jaws 26 comprise a main body portion 43, a lip portion 49, and an upwardly extending lobe portion 51, through which are inserted pivot pins 48. The chuck body 45 contains recesses 50 which receive the pins 48, whereby the jaws 26 are hingedly mounted on the chuck body 45. The jaws 26 extend below body 45 and are pivotal about the longitudinal axis 48a of the pins 48. The mounting allows for quick removal and replacement of chuck jaws, for example, to accommodate containers having different mouth sizes.

The jaws 26 are so shaped that in the closed position, as shown in FIGS. 2 and 4, they form a substantially enclosed annulus about the container finish 24 thereby serving as an effective finish mask to screen it away from any coating material. The jaws 26 may be formed by first forming an integral, annular article and then saw-cutting the article to provide arcuate sections or jaws 26 suitable for mounting in the support body 45.

Vertically movable or shiftable on the spindle 34 is a flange 53 having an annular sleeve 52 below it which, when the flange is raised, is out of engagement with the jaws 26, but which when unrestrained drops and engages the jaws 26 thereby pivoting them about their pivot axes 48a to the closed position shown in FIG. 4. In the closed position, the lip portions 49 of the chuck jaws 26 engage a rib 54 on the container finish 24 whereby the container 22 is supported by the jaws 26 and is suspended from the lip portion 49 thereof. The annular sleeve 52 holds the jaws 26 inwardly.

Also mounted on the spindle 34 by means of a fixed pin 55 is a pinion gear 56 adapted to engage a rack (not shown) at the coating station whereby the spindle 34 and, consequently, the container 22, can be rotated about its vertical axis during the coating operation to allow for uniform coating of the exterior surface of the container 22.

In combination with the chuck assembly 16 is a lift assembly 20 comprising a shaft 58 vertically reciprocable within a concentric casing 60. Mounted at the upper end of the shaft 58 is a cam follower 62 which rides on an overhead cam track as support means 64 concentric with the table drive shaft 12. The casing 60 is rigidly fixed to the drive shaft 12 by means of a flange 66 and is radially aligned with the container trays 14 so as to move therewith.

At the respective opposite end of the lift shaft 58 is a horizontally disposed lift 68 which engages the annular flange 53 of the sleeve 52 as the chuck assembly 16 moves over the plane of the rotating table 10, for moving the sleeve 52 into and out of engagement with the chuck jaws 26. In the preferred embodiment, the lift 68 comprises a fork having fingers 70 which are engageable around the annular sleeve 52 below the flange portion 53 thereof so that on upward movement of the vertically reciprocable lift shaft 58 the annular sleeve 52 is moved upwardly on the spindle 34 out of engagement with the chuck jaws 26.

Attached to the casing 60 is a second horizontal member 74 also of fork design adapted to engage the spindle 34 in the same manner as the lift means 68 engages the sleeve 52, to maintain the chuck assembly 16 in axial alignment with its respective container tray 14 during the loading operation.

The chuck jaws 26 are so mounted that when the annular sleeve 52 is moved out of engagement therewith, the jaws 26 freely swing to the open position toward which they are biased by gravity, thereby releasing the container 22. That is, the jaws 26 are designed so that their center of gravity 75 lies radially interiorly of the pivotal axis 48a of the jaws 26 in the closed position whereby on release of the annular sleeve, the jaws 26 swing radially outwardly by the force of gravity until the center of gravity 75 of the jaws 26 lies beneath the pivotal axis 48a (see FIG. 3).

OPERATION

The individual containers 22 are either manually or automatically placed on the trays 14 carried on the rotating table 10. The chuck assemblies 16 approaching the table 10 are now in the closed position as a result of the annular sleeve 52 being lowered and engaging the jaws 26. As the chuck assembly 16 indexes above a container tray 14, the horizontal member 74 is carried by the table into engagement with the spindle 34 and the lift means 68 is carried into engagement with the annular flange 53 and, the reciprocal shaft 28 attached to the container tray 14 begins to contact the cam track 32 thereby raising the container tray 14. The cam follower 62 attached to the vertically reciprocal lift shaft 58 of the lift mechanism 20 more or less simultaneously begins to ride up on the overhead cam track 64 thereby raising the horizontal lift means 68 and raising the annular sleeve 52 out of engagement with the chuck jaws 26. The chuck jaws 26 freely swing open and the container tray 14 reaches its raised position with the container finish portion 24 interposed between the open chuck jaws 26.

As the table 10 continues to rotate, the cam follower 62 then rides down the cam track 64 lowering the annular sleeve 52 into camming engagement with the chuck jaws 26 thereby swinging them to the closed position. The chuck jaw lip portion 49 engages the rib 54 of the container finish 24. With the chuck jaws 26 now in their closed position, as shown in FIG. 4, the container tray 14 rides off its cam track 32 and falls to its lowered position whereby the container 22 is supported solely by the finish 24. The chuck assembly 16 with the container 22 suspended therefrom then exits the circumference of the rotating table, as shown at point B of FIG. 6, carrying the container 22 to the coating operation.

When the assembly reaches the coating operation the pinion gear 56 may engage a rack (not shown) thereby turning the spindle 34 about its longitudinal axis and spinning the container 22 to allow for uniform coating thereof. After coating or other treatment, the chuck assembly 16 indexes into a second rotating table (not shown) wherein the container 22 is unloaded from the chuck assembly in the reverse manner from which it was loaded. That is, the spindle 34 and annular sleeve 52 index into the lift mechanism 20 and the annular sleeve 52 is raised out of engagement with the chuck jaws 26. As this occurs the chuck jaws 26 freely swing open and release the container 22 which is now seated in a raised container tray 14. After unloading, the continuously moving line of chuck assemblies 16 return by means of the drive track 18 to the loading table 10 where the process is repeated.

Although my invention has been described in terms of a certain preferred embodiment, it will be recognized by those skilled in the art that other forms may be adopted within the scope of my invention. For example, although my invention has been described in terms of a certain container handling system it is to be recognized that my invention may be easily adapted to different systems. Furthermore, although my invention has been described in terms of handling glass containers it will be recognized that it is equally applicable to other containers, for example, plastic or metal containers or other articles.

What is claimed is:

1. Apparatus for supporting a container in a vertical position by a finish portion thereof comprising, in combination,
    a chuck assembly comprising:
    a spindle,
    means for mounting said spindle vertically,
    a chuck body carried by said spindle,
    a plurality of chuck jaws mounted by said body for pivotal movement about horizontal axes, between a radially outward open position and a radially inward closed position, said jaws being so shaped that when in said closed position in use they form a substantially closed mask about the finish portion of a container supported by the chuck assembly,
    and an annular sleeve shiftable along said spindle and operative to engage and cam said jaws to pivot about the horizontal axes thereof from said open position to said closed position,
    each said jaw including a lip portion adapted to engage said finish portion when in said closed position so that said jaws support said container,
    the mounting of each said jaw for pivotal movement being such that each jaw is biased by the force of gravity to pivot from said closed position outwardly toward said open position when said sleeve is out of engagement therewith;
    vertically movable means for shifting said sleeve along said spindle into and out of closing engagement with said jaws,
    and support means for said vertically movable means.

2. The apparatus of claim 1 wherein said means for shifting said sleeve along said spindle into and out of closing engagement with said jaws comprises a lift assembly comprising a vertically reciprocable shaft having a fork attached thereto, said fork extending horizontally from said shaft and engageable with said annular sleeve to shift the latter along said spindle, vertically with respect to said jaws.

3. Apparatus for supporting a container in a vertical position by a finish portion thereof comprising, in combination,
    a chuck assembly comprising a chuck body having a vertical axis and a plurality of recesses therein,
    a plurality of chuck jaws mounted by said body,
    each said jaw including a main body portion, a lip portion, an upwardly extending lobe portion, and a horizontal pivot pin extending transversely through said lobe portion and seated in a respective one of said recesses,
    the said jaws being pivotally movable about the pivot pins between an open position and a radially inward closed position wherein said jaws in use form a mask about the finish portion of a container supported by the chuck assembly,
    an annular sleeve,
    and means supporting the said sleeve for movement along said vertical axis,
    said sleeve being operative to engage and cam said jaws from said open position to said closed position,
    the said lip portions being adapted to engage said finish portion in said closed position and to support said container thereby while said jaws form said mask about said finish portion,
    said jaws being so mounted by said pivot pins, with respect to their centers of mass, as to be biased by the force of gravity from said closed position toward said open position when said sleeve is out of engagement therewith;
    and means engageable with said sleeve for lifting said sleeve out of engagement with said jaws.

4. The apparatus of claim 3 wherein said means for lifting said sleeve out of engagement with said jaws comprises a lift assembly comprising a vertically mounted shaft having a fork attached thereto and extending horizontally therefrom, means for moving said lift assembly into position to engage the sleeve for lifting it, and means for moving said shaft and fork vertically, when engaged with said sleeve, thereby to lift said sleeve and permit said jaws to open.

5. Apparatus for supporting a container in a vertical position by a finish portion thereof comprising, in combination, a movable chuck assembly comprising a vertically disposed spindle, a housing receiving and supporting an upper end of said spindle, a chuck body mounted at the lower end of said spindle, a plurality of vertically disposed chuck jaws mounted by said body and extending therebelow, the said jaws being pivotally movable between a spread apart open position and a radially inward closed position, said jaws being shaped to form a substantially closed mask about the finish portion of a container carried there in use, and an annular sleeve vertically shiftable along said spindle with respect to said body, said spindle holding said sleeve in alignment with said jaws for engaging and camming said jaws from said open position to said closed position, each said jaw including a lip portion adapted to engage said finish portion in said closed position and to support said container thereby, said jaws being so pivoted as to be biased by the force of gravity from said closed position to said open position when said sleeve is out of engagement therewith, a track defining a fixed predetermined path, means for moving said chuck assembly along said track, a movable lift assembly adapted to move in synchronization with said chuck assembly over at least a portion of said path comprising a shaft vertically reciprocal within a concentric casing, first fork means attached to and extending from said shaft and engageable around said annular sleeve, said first fork means shiftable vertically with respect to said casing to move said sleeve into and out of engagement with said jaws, and second fork means attached to and extending from said casing and engageable around said spindle to maintain said lift assembly in synchronization with the movement of said chuck assembly, and means for driving said lift assembly.

6. Apparatus for supporting a container in a vertical position by a finish portion thereof comprising, in combination, a movable chuck assembly comprising a rotatable vertically disposed spindle having an upper end and a lower end, a housing mounting said spindle at said upper end thereof, a chuck body mounted at the lower end of said spindle, said body including a plurality of recesses therein, a plurality of vertically disposed chuck jaws mounted by said body, each said jaw including a main body portion, a lip portion, an upwardly extending lobe portion, and a pivot pin having a horizontal axis and extending transversely through said lobe portion and adapted to seat in a respective one of said recesses, the said jaws being pivotally movable about the axes of said pins between an open position and a radially inward closed position wherein said jaws form a substantially closed annulus about said finish portion to mask the latter from application of a coating to said container, and an annular sleeve vertically movable on said spindle and operative to engage and cam said jaws from said open position to said closed position, the said lip portions being adapted to engage and mask said finish portion in said closed position and to support said container thereby, said jaws being so mounted on said pivot pins as to be biased by the force of gravity from said closed position toward said open position when said sleeve is out of engagement therewith, a track defining a fixed predetermined path, means for driving said assembly along said track, a movable lift assembly adapted to move in synchronization with said chuck assembly over at least a portion of said path comprising a shaft vertically reciprocal with a concentric casing, first fork means attached to said shaft and extending therefrom, engageable around said annular sleeve to move said sleeve into and out of engagement with said jaws, and second fork means attached to said casing and extending therefrom, engageable around said spindle to maintain said lift assembly in synchronization with the movement of said chuck assembly, and means for driving said lift assembly.

\* \* \* \* \*